(12) United States Patent
Gu et al.

(10) Patent No.: US 11,373,426 B2
(45) Date of Patent: Jun. 28, 2022

(54) METHOD FOR DETECTING KEY POINTS IN SKELETON, APPARATUS, ELECTRONIC DEVICE AND STORAGE MEDIUM

(71) Applicant: BEIJING DAJIA INTERNET INFORMATION TECHNOLOGY CO., LTD., Beijing (CN)

(72) Inventors: Jili Gu, Beijing (CN); Lei Zhang, Beijing (CN); Wen Zheng, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 77 days.

(21) Appl. No.: 17/085,214

(22) Filed: Oct. 30, 2020

(65) Prior Publication Data

US 2021/0049356 A1 Feb. 18, 2021

Related U.S. Application Data

(63) Continuation of application No. PCT/CN2019/110582, filed on Oct. 11, 2019.

(30) Foreign Application Priority Data

Nov. 7, 2018 (CN) .......................... 201811319932.7

(51) Int. Cl.
*G06V 40/10* (2022.01)
*G06K 9/62* (2022.01)
(Continued)

(52) U.S. Cl.
CPC ........... *G06V 40/10* (2022.01); *G06K 9/6256* (2013.01); *G06K 9/6262* (2013.01); *G06N 3/04* (2013.01); *G06N 3/08* (2013.01)

(58) Field of Classification Search
None
See application file for complete search history.

(56) References Cited

U.S. PATENT DOCUMENTS

2018/0186452 A1 7/2018 Tian et al.
2019/0303677 A1* 10/2019 Choutas ................. G06V 10/82

FOREIGN PATENT DOCUMENTS

CN 108197633 A 6/2018
CN 108229490 A 6/2018
(Continued)

OTHER PUBLICATIONS

Alejandro Newell et al "Stacked Hourglass Networks for Human Pose Estimation", University of Michigan Jul. 2016 (Year: 2016).*
(Continued)

*Primary Examiner* — Leon Flores
(74) *Attorney, Agent, or Firm* — Timothy W. Menasco, Esq.; Harter Secrest & Emery LLP

(57) ABSTRACT

A method for detecting key points of skeleton, an apparatus, an electronic device, and a storage medium are provided. The method is implemented as follows. An original image is acquired. The original image includes a plurality of key points of skeleton. Based on a pre-trained stacked hourglass network structure, skeleton key point identification is performed on the original image to obtain heat maps of the plurality of key points. The stacked hourglass network structure includes at least one hourglass network. The at least one hourglass network is configured to perform deep-layer feature learning on feature maps of the plurality of key points based on weight values corresponding to the feature maps.

12 Claims, 5 Drawing Sheets

(51) Int. Cl.
G06N 3/04 (2006.01)
G06N 3/08 (2006.01)

(56) References Cited

FOREIGN PATENT DOCUMENTS

| | | |
|---|---|---|
| CN | 108229497 A | 6/2018 |
| CN | 108280455 A | 7/2018 |
| CN | 108427927 A | 8/2018 |
| CN | 108596258 A | 9/2018 |
| CN | 108764133 A | 11/2018 |
| CN | 109670397 A | 4/2019 |

OTHER PUBLICATIONS

ISR for PCTCN2019110582.
English translation of ISR for PCTCN2019110582.
OA for CN application 201811319932.7.
English translation of OA for CN application 201811319932.7.
Research on Human Skeleton Extraction Based on Deep Learning.
Notice of Allowance for CN application 201811319932.7 with English Translation.

* cited by examiner

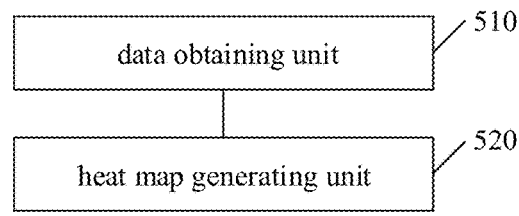
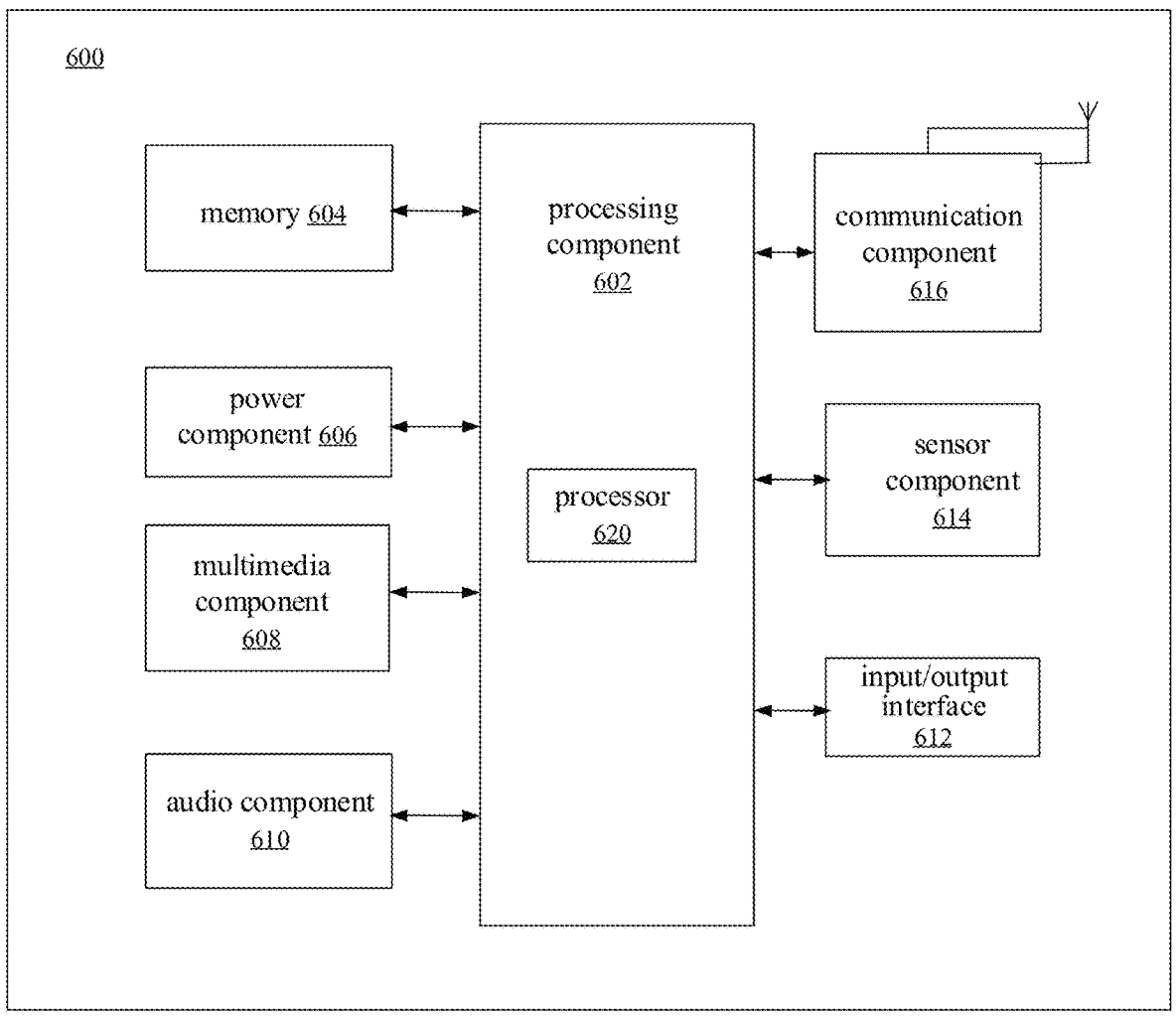

METHOD FOR DETECTING KEY POINTS IN SKELETON, APPARATUS, ELECTRONIC DEVICE AND STORAGE MEDIUM

CROSS-REFERENCE TO RELATED APPLICATION(S)

The present disclosure is a continuing application, filed under 35 U.S.C. § 111(a) of International Application No. PCT/CN2019/110582 filed on Oct. 11, 2019, which claims priority to Chinese Patent Application No. 201811319932.7, entitled "method for detecting key points in human skeleton, apparatus, electronic device and storage medium" filed with the China National Intellectual Property Administration on Nov. 7, 2018, the disclosure of which is incorporated herein by reference.

FIELD

The present disclosure relates to a field of computer software applications, and more particularly to a method and an apparatus for detecting key points of skeleton, an electronic device and a storage medium.

BACKGROUND

Key points of human skeleton are very important for describing a human pose and predicting a human behavior. Therefore, detection of the key points of human skeleton is the basis of a plurality of computer vision tasks, such as an action classification, an abnormal behavior detection, automatic driving and so on. The detection of the key points of human skeleton mainly detects some key points of a human body, such as joints, limbs, facial features, etc., and then information of the human pose is described by the detected key points. Moreover, since the human body has a considerable flexibility, there may be various poses and shapes, and a small change in any part of the human body may lead to a new pose. The visibility of the key points of human body is greatly affected by dresses, a pose, an angle of view, etc., and may also affected by an environment such as shade, light and fog.

SUMMARY

According to a first aspect of embodiments of the present disclosure, a method for detecting key points of skeleton is provided. The method includes: obtaining an original image, the original image including a plurality of key points of skeleton; and obtaining heat maps of the plurality of key points by performing key-point recognition on the original image based on a pre-trained hourglass network structure. The pre-trained hourglass network structure includes at least one hourglass network, and the at least one hourglass network is configured to perform deep-layer feature learning on feature maps of the plurality of key points based on weight values corresponding to the feature maps.

According to a second aspect of embodiments of the present disclosure, an apparatus for detecting key points of skeleton is provided. The apparatus includes: a data obtaining unit and a heat map generating unit. The data obtaining unit is configured to obtain an original image. The original image includes a plurality of key points of skeleton. The heat map generating unit is configured to obtain heat maps of the plurality of key points by performing key-point recognition on the original image based on a pre-trained hourglass network structure. The pre-trained hourglass network structure includes at least one hourglass network, and the at least one hourglass network is configured to perform deep-layer feature learning on feature maps of the plurality of key points based on weight values corresponding to the feature map.

According to a third aspect of embodiments of the present disclosure, an electronic device is provided. The electronic device includes a processor and a storage device. The storage device is configured to store instructions executable by the processor. The processor is configured to: obtain an original image, the original image including a plurality of key points of skeleton; and obtain heat maps of the plurality of key points by performing key-point recognition on the original image based on a pre-trained hourglass network structure. The pre-trained hourglass network structure includes at least one hourglass network, and the at least one hourglass network is configured to perform deep-layer feature learning on feature maps of the plurality of key points based on weight values corresponding to the feature map.

According to a fourth aspect of embodiments of the present disclosure, a non-transitory computer-readable storage medium is provided. The computer-readable storage medium has computer instructions stored thereon. When the computer instructions are executed, the method for detecting the key points of skeleton described above is implemented.

It should be understood that, the above general description and the following detailed description are merely exemplary and explanatory, and do not limit the present disclosure.

BRIEF DESCRIPTION OF THE DRAWINGS

In order to clearly illustrate technical solutions of embodiments of the present disclosure, a brief description of accompanying drawings used in embodiments is given below. Obviously, the accompanying drawings in the following descriptions are only part embodiments of the present disclosure, and for those skilled in the art, other accompanying drawings can be obtained according to these accompanying drawings without creative labor.

FIG. 5 is a block diagram illustrating an apparatus for detecting key points of skeleton according to an example embodiment.

FIG. 6 is a block diagram illustrating an electronic device capable of executing a method for detecting key points of skeleton according to an example embodiment.

DETAILED DESCRIPTION

In order to make the objectives, technical solutions, and advantages of the present disclosure clearer, the present disclosure will be described in detail below with reference to the accompanying drawings and embodiments. Obviously, embodiments described here are only part of embodiments of the present disclosure and are not all embodiments of the present disclosure. Based on the embodiments of the present disclosure, other embodiments obtained by those skilled in the art without creative labor are within the scope of the present disclosure.

In the related art, a method for detecting the key points of human skeleton is based on a modification or improvement of a stacked hourglass algorithm. The stacked hourglass algorithm is an algorithm proposed by Falnewell et al., which is applied to human pose estimation. The stacked hourglass algorithm predicts the key points of human body by generating heat maps. In detail, in a process of detecting the key points of human skeleton, the stacked hourglass algorithm in the related art has a same degree of deep-layer learning for different feature maps of key points of human skeleton.

It is realized that the heat maps of the key points of human skeleton have a low accuracy when a related technology is utilized to detect the key points of human skeleton, and the accuracy of detecting the key points of human skeleton is ultimately affected.

In order to achieve the purpose of improving the accuracy of a learned heat map of a plurality of key points of skeleton and improving the accuracy of detecting the key points of skeleton, embodiments of the present disclosure provide a method and an apparatus for detecting key points of skeleton, an electronic device and a storage medium.

A method for detecting key points of skeleton according to embodiments of the present disclosure will be described below.

An execution subject of the method for detecting the key points of skeleton according to embodiments of the present disclosure may be an apparatus for detecting key points of skeleton. The apparatus for detecting the key points of skeleton may be operated in an electronic device. In a detailed application, the electronic device may be a server or a terminal device.

Figure 1:
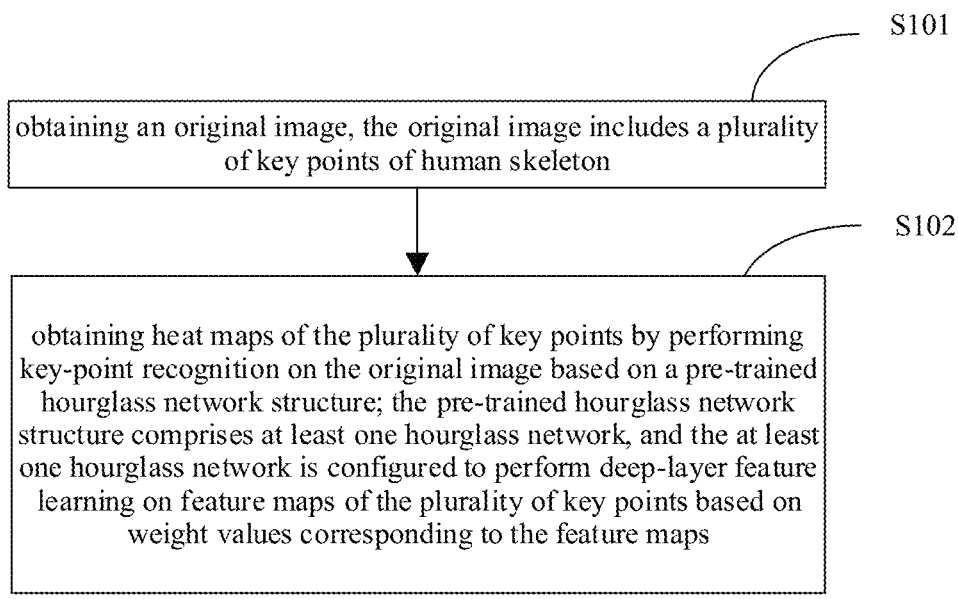
FIG. 1 is a flow chart illustrating a method for detecting key points of skeleton according to an example embodiment.

FIG. 1 is a flow chart illustrating a method for detecting key points of skeleton according to an example embodiment. As illustrated in FIG. 1, the method for detecting the key points of skeleton according to the embodiment of the present disclosure includes the followings.

At block S101, an original image is obtained. The original image includes a plurality of key points of skeleton.

At this block, a picture of a human pose is extracted from a file (such as a video or an image) as the original image. The original image includes the plurality of key points of skeleton, such as joints, limbs and facial features. Then, information of the human pose may be described by analyzing the plurality of key points of skeleton after the plurality of key points of skeleton included in the original image are obtained.

There are many ways for extracting the picture of the human pose from the file such as the video or the image. For example, a pre-trained neural network model is utilized to extract the picture of the human pose from the file such as the video or the image.

In addition, a color model of the original image may be a RGB color model, i.e., a three-color (red, green and blue) model, which is not limited thereto. For example, the color model of the original image may also be one of a CMYK color model and a HSB color model. The CMYK color model is a printing model, and the letter "C" refers to cyan, the letter "M" refers to magenta, the letter "Y" refers to yellow, and the letter "K" refers to black, which represent four colors of ink in printing. The HSB color model is a color model in which color elements are hue, saturation and brightness.

At block S102, heat maps of the plurality of key points of skeleton are obtained by recognizing the key points of the plurality of skeleton from the original image based on a pre-trained hourglass network structure for skeleton keypoint detection. The pre-trained hourglass network structure includes at least one hourglass network, and the at least one hourglass network is configured to perform deep-layer feature learning on feature maps of the plurality of key points of skeleton based on weight values corresponding to the feature maps.

It should be noted that, the output of each hourglass network is heat maps of the key points of skeleton. For a non-last hourglass network in the hourglass network structure, the outputted heat maps are used as input content of a next hourglass network, while for the last hourglass network in the hourglass network structure, the outputted heat maps are used as a final output result of the original image.

In this embodiment, considering influence of different feature maps on the different heat maps of the key points of skeleton, compared with the prior art, an attention mechanism is added to each hourglass network in the pre-trained hourglass network structure employed in embodiments of the present disclosure. That is, weight values are set for the feature maps of the key points of skeleton, such that there is difference in the degree of deep-layer learning for different feature maps.

It should be understood that, a topological structure of any hourglass network is symmetrical, and a network structure of any hourglass network looks like an hourglass. In addition, the number of hourglass networks included in the pre-trained hourglass network structure may be set based on an actual situation, which is not limited in the present disclosure. An order of each hourglass network may also be set based on an actual situation, which is not limited in the present disclosure. The hourglass network is generally a second-order hourglass network, i.e., a network with two network structures symmetrical to each other, but it is certainly not limited to this.

At this block, in the plurality of hourglass networks, by introducing the attention mechanism by means of learning through Senet, the weight values corresponding to the feature maps may be automatically obtained, and the deep-layer feature learning of the feature maps may be adjusted based on the obtained weight values. A core idea of the Senet is to learn feature weights based on losses by the network, such that the weight value of an effective feature map is large, and the weight value of an ineffective feature map or a less effective feature map is small, thereby enabling a trained model to achieve a better result. It should be noted that, introducing the attention mechanism by the means of the learning through Senet is merely a detailed implementation, and should not constitute a limitation of embodiments of the present disclosure. Any detailed implementation that may obtain the weight values corresponding to the feature maps of the key points of skeleton may be applied to the present disclosure.

In addition, since each feature map may be used as a feature channel, the weight value corresponding to each feature map may also be called the weight value of the feature channel corresponding to the feature map. In addition, after the heat maps of the plurality of key points of skeleton are obtained, a coordinate position of each key point of skeleton may be obtained based on the obtained heat maps, and then information of the human pose in the original image may be analyzed by utilizing the coordinate position of each key point of skeleton.

In embodiments of the present disclosure, the hourglass network structure is constructed in advance. In each hourglass network of the constructed hourglass network structure, the deep-layer feature learning is performed on the feature maps of the plurality of key points of skeleton based on the weight values corresponding to the feature maps of the plurality of key points of skeleton. Then, the key points of skeleton are recognized from the original image based on the pre-trained hourglass network structure for the skeleton key-point detection, to obtain the heat maps of the plurality of key points of skeleton. In this solution, considering influence of different feature maps on the different heat maps of the key points of skeleton, the attention mechanism is introduced to the process of detecting the key points of skeleton. That is, the weight values are set for the feature maps of the key points of skeleton, such that there is difference in the degree of deep-layer learning for different feature maps. Therefore, with this solution, the accuracy of the learned heat maps of the plurality of key points of skeleton may be improved, thereby improving the accuracy of detecting the key points of skeleton.

Exemplarily, in a detailed implementation, a detailed structure of each hourglass network may be as follows.

In each hourglass network, before each downsampling, a skip path is separated from a convolution path, the skip path is configured to retain the feature maps with an original scale, and the original scale is a scale of the feature maps before the downsampling.

After each upsampling, the feature maps on the convolution path are fused with the feature maps on the skip path corresponding to the upsampling. The skip path corresponding to the upsampling is a skip path separated before a downsampling symmetrical to the upsampling.

A plurality of convolution modules and a plurality of attention mechanism modules exist between two adjacent downsamplings.

One or more convolution modules exist between two adjacent upsamplings.

A plurality of convolution modules and a plurality of attention mechanism modules exist between a downsampling and an upsampling adjacent to the downsampling.

Each skip path includes a plurality of convolution modules and a plurality of attention mechanism modules arranged alternately.

In an embodiment, based on the aforementioned structure of each hourglass network, obtaining the heat maps can be performed as follows. The original image is obtained by a convolution path of the hourglass network for processing on the convolution path. The processing on the hourglass network includes N downsamplings, N upsamplings, feature learning after each downsampling and fusing of feature maps after each upsampling, an output of the k-th feature learning is taken as an input of the (k+1)-th downsampling, an output of the N-th feature learning is taken as an input of the first upsampling, where N is an integer, k is an integer, and 0<k<N. An input of the i-th downsampling is transmitted to an i-th skip path for feature learning on the skip path, where i is an integer, and 0<i<=N. An output of each skip path is received by the convolution path, and the output of the i-th skip path and an output of the (N+1−i)-th upsampling are taken as inputs of the (N+1−i)-th fusing of feature maps. An output of the k-th fusing of feature maps is taken as an input of the (k+1)-th upsampling. The heap map of a key point is obtained after the N-th fusing of feature maps.

With respect to the plurality of convolution modules and the plurality of attention mechanism modules included between the two adjacent downsamplings, the number of the plurality of convolution modules is greater than that of the plurality of attention mechanism modules, and each attention mechanism module is located between two convolution modules. Similarly, with respect to the plurality of convolution modules and the plurality of attention mechanism modules included between the downsampling and the adjacent upsampling of the downsampling, the number of the plurality of convolution modules is greater than that of the plurality of attention mechanism modules, and each attention mechanism module is located between two convolution modules. With respect to the plurality of convolution modules and the plurality of attention mechanism modules included in each skip path, the number of the plurality of convolution modules is greater than that of the plurality of attention mechanism modules, and each attention mechanism module is located between two convolution modules.

Figure 3A:
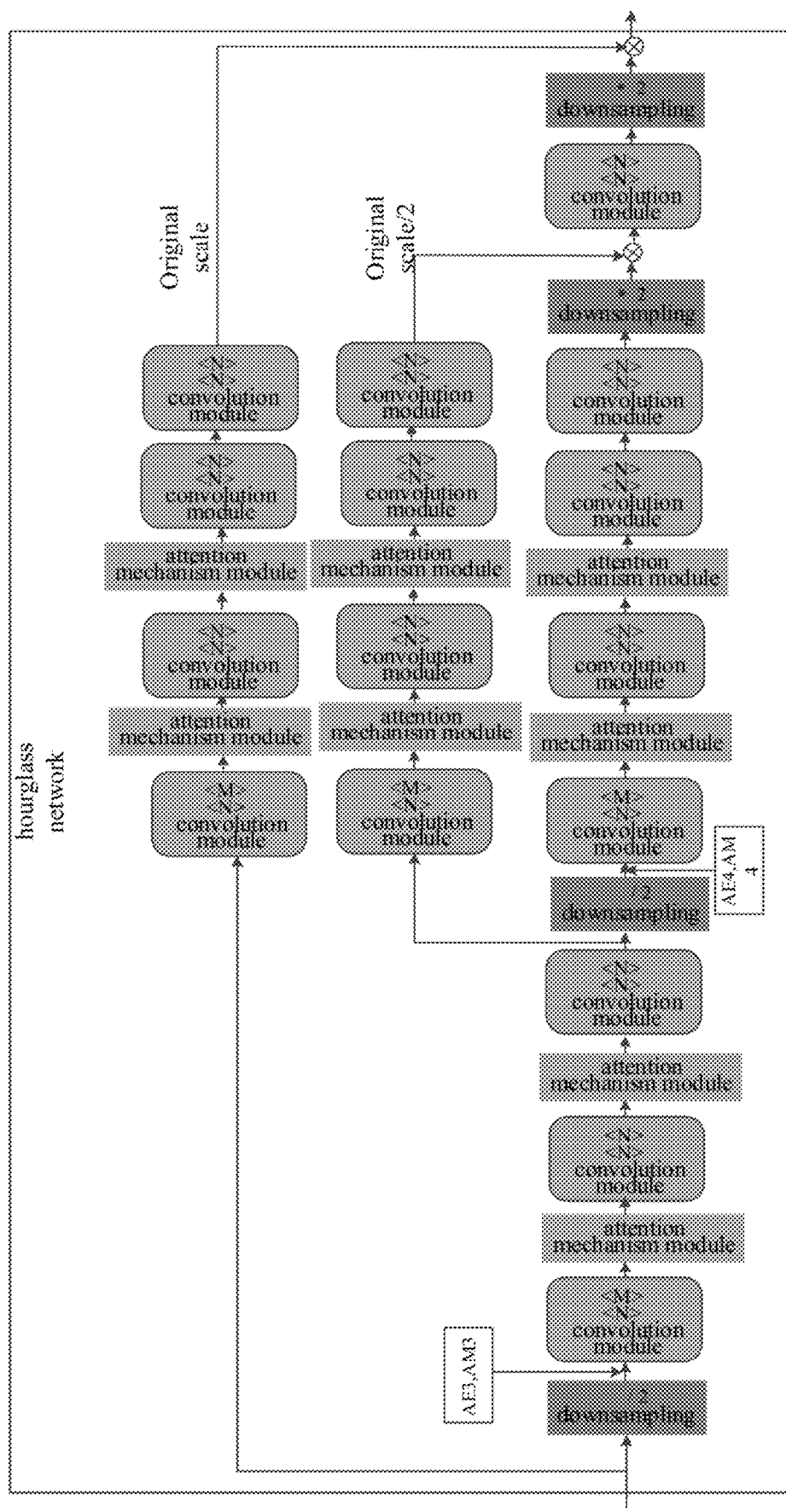
FIG. 3a is a block diagram illustrating a hourglass network according to an example embodiment of the present disclosure.
Figure 3B:
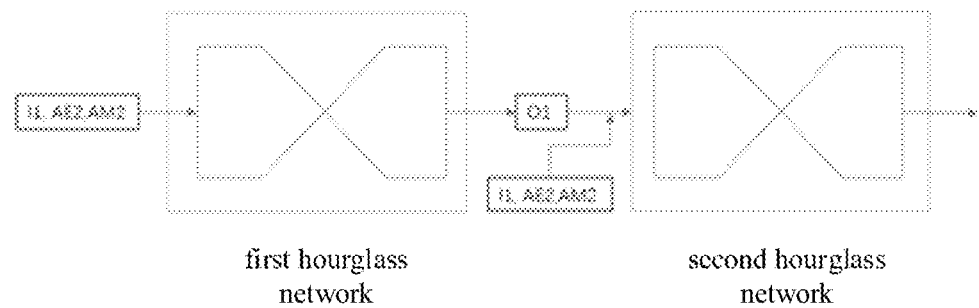
FIG. 3b is a schematic diagram illustrating stacked hourglass networks according to an example embodiment of the present disclosure.

An example structure of the hourglass network may be illustrated in FIG. 3a. In addition, as illustrated in FIG. 3b, a schematic diagram of hourglass network structure with two hourglass networks connected in series is illustrated, in which the topological structure of each hourglass network is symmetrical.

In each hourglass network, the feature maps of the plurality of key points of skeleton are extracted by each convolution module.

In the attention mechanism module, a set of weight values corresponding to the feature maps of the plurality of key points of skeleton may be obtained by learning through a Senet algorithm.

In an embodiment, the feature learning is performed as follows. The feature maps are extracted. A set of weight values corresponding to the feature maps is generated by learning through a Senet algorithm. The feature learning is performed on the feature maps based on the weight values.

The convolution module may have various structures, which is not limited in the present disclosure.

Exemplarily, in an implementation, the attention mechanism module includes a global pooling layer, a plurality of fully connected layers and a nonlinear activation layer. The global pooling layer is configured to perform dimension reduction on the feature maps of the plurality of key points of skeleton. The plurality of fully connected layers (FC) are configured to synthesize the feature maps of the plurality of key points of skeleton after the dimension reduction to obtain a one-dimensional vector. The nonlinear activation layer is configured to normalize the one-dimensional vector into a feature vector. The number of the fully connected layers may be arbitrarily set. Any node in the fully connected layer may be connected with each node in a previous layer and a following layer, that is, each node in the fully connected layer is connected with all nodes in the previous layer, so as to synthesize the previously extracted feature maps. In the nonlinear active layer, the image is normalized to a certain interval by a sigmoid function. The sigmoid function is often used as a threshold function of a neural network, to map variables to a range of 0 and 1.

Under a case that the attention mechanism module includes the global pooling layer, the plurality of fully connected layers and the nonlinear activation layer, exemplarily, in an implementation, in the attention mechanism module, the feature maps of the plurality of key points of skeleton are transmitted in a downlink path network and an uplink path network.

In the uplink path network, the dimension reduction is performed on the feature maps of the plurality of key points of skeleton by the global pooling layer.

In the uplink path network, the feature maps of the plurality of key points of skeleton after the dimension reduction are synthesized by the learning through the Senet algorithm of the plurality of fully connected layers to obtain a one-dimensional vector.

In the uplink path network, the one-dimensional vector is normalized into a feature vector by the nonlinear activation layer.

The feature maps of the plurality of key points of skeleton in the downlink path network are fused with the feature vector.

In an embodiment, based on the above mentioned structure of the attention mechanism module, the feature learning is performed on the feature maps based on the weight value as follows. The feature maps are transmitted in a first path network and a second path network. Dimension reduction is performed on the feature maps, a one-dimensional vector is obtained by synthesizing the feature maps after the dimension reduction by the learning through the Senet algorithm and the one-dimensional vector is normalized into a feature vector in the second path network. The feature maps are fused with the feature vector in the first path network.

Figure 4:
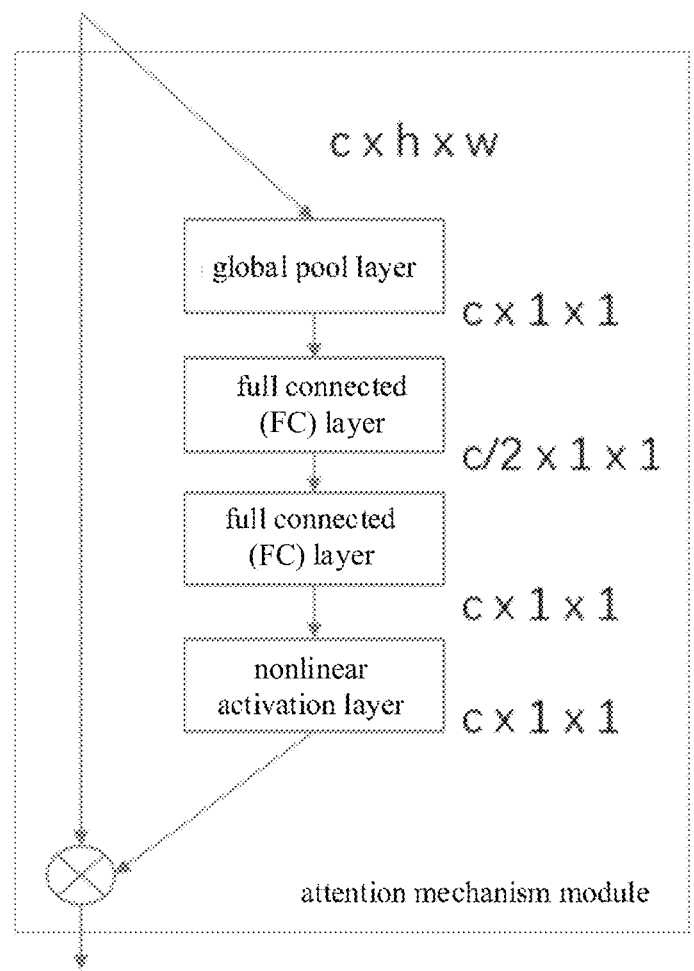
FIG. 4 is a block diagram illustrating an attention mechanism module according to an example embodiment of the present disclosure.

For clarity, FIG. 4 illustrates a block diagram an attention mechanism module. As illustrated in FIG. 4, in the uplink path network, the dimension reduction is performed on the feature maps of the plurality of key points of skeleton by the global pooling layer. In the uplink path network, the feature maps of the plurality of key points of skeleton after the dimension reduction are synthesized by learning through the Senet algorithm of two fully connected layers to obtain the one-dimensional vector. In the uplink path network, the one-dimensional vector is normalized into the feature vector by the nonlinear activation layer. In the expression of c×h×w, c represents the number of channels, h represents a height of the feature map, and w represents a width of the feature map. The number of channels may be directly specified in the fully connected layer of the neural network. The feature maps of the plurality of key points of skeleton in the downlink path network are fused with the feature vector.

In an embodiment, to reduce the calculation amount, before obtaining the heat maps by recognizing the plurality of key points of skeleton from the original image based on the pre-trained hourglass network structure for the skeleton key-point detection, the method further includes: performing a plurality of downsamplings on the original image to obtain a first image.

Correspondingly, obtaining the heat maps by recognizing the plurality of key points of skeleton from the original image based on the pre-trained hourglass network structure for the skeleton key-point detection includes: obtaining the heat maps by inputting the first image into the pre-trained hourglass network structure.

The sampling number of the plurality of downsamplings described above is not limited. Exemplarily, two downsamplings may be performed on the original image to obtain the first image. In detail, through the convolution layer with a step size of 2, a resolution of the original image is reduced by the factor of 2 in each downsampling.

In an embodiment, on the basis of performing the plurality of downsamplings, before obtaining the heat maps by inputting the first image into the pre-trained hourglass network structure, the method further includes: performing a plurality of max-pooling samplings and a plurality of average pooling samplings on the original image.

Correspondingly, obtaining the heat maps by inputting the first image into the pre-trained hourglass network structure includes: obtaining the heat maps by inputting the first image, an image obtained by each max-pooling sampling and an image obtained by each average pooling sampling into the pre-trained hourglass network structure.

It should be understood that, the pooling technology is used to reduce the number of features and the number of parameters. In detail, feature points in a neighborhood to be processed are integrated to obtain a new feature. The average pooling means merely averaging the feature points in the neighborhood, while the max-pooling means taking a maximum value of the feature points in the neighborhood.

In this embodiment, the plurality of max-pooling samplings are performed on the original image in advance to obtain a plurality of max-pooling images, and the plurality of average pooling samplings are performed on the original image in advance to obtain a plurality of maximum average pooling images. In the pooling process, information of a plurality of nearby pixels may be utilized, such that the context is introduced into the extracted feature maps of the plurality of key points of skeleton, thus improving the accuracy of detecting the plurality of key points of skeleton.

Alternatively, in an implementation, the pre-trained hourglass network structure includes a first hourglass network and a second hourglass network connected in series. Each of the first hourglass network and the second hourglass network is a second-order hourglass network.

Performing the plurality of max-pooling samplings and the plurality of average pooling samplings on the original image includes: obtaining a first max-pooling image by performing the max-pooling sampling on the original image, and obtaining a first average pooling image by performing the average pooling sampling on the original image; obtaining a second max-pooling image by performing the max-pooling sampling on the first max-pooling image, and obtaining a second average pooling image by performing the average pooling sampling on the first average pooling image; obtaining a third max-pooling image by performing the max-pooling sampling on the second max-pooling image, and obtaining a third average pooling image by performing the average pooling sampling on the second average pooling image; and obtaining a fourth max-pooling image by performing the max-pooling sampling on the third max-pooling image, and obtaining a fourth average pooling image by performing the average pooling sampling on the third average pooling image.

Obtaining the heat map by Inputting the first image, the image obtained by each max-pooling sampling and the image obtained by each average pooling sampling into the pre-trained stacked hourglass networks includes: inputting the first image, the first max-pooling image and the first average pooling image into the first hourglass network; inputting a heat map outputted by the first hourglass network into the second hourglass network, and simultaneously feeding the first image, the second max-pooling image and the second average pooling image into the second hourglass network and obtaining the heat map of a key point from the second hourglass network; inserting the third max-pooling image and the third average pooling image into the convolution path of each hourglass network after the hourglass network performs the first downsampling; and inserting the fourth max-pooling image and the fourth average pooling image into the convolution path of each hourglass network after the hourglass network performs the second downsampling.

In this implementation, merely the plurality of max-pooling images and the plurality of average pooling images need to be inserted in each hourglass network, which further reduces the calculation amount and improves the calculation speed.

In order to enable the solution clear, the method for detecting the key points of skeleton according to embodiments of the disclosure will be described below with reference to detailed embodiments.

In a detailed embodiment, the pre-trained hourglass network structure includes a first hourglass network and a second hourglass network connected in series.

Figure 2:
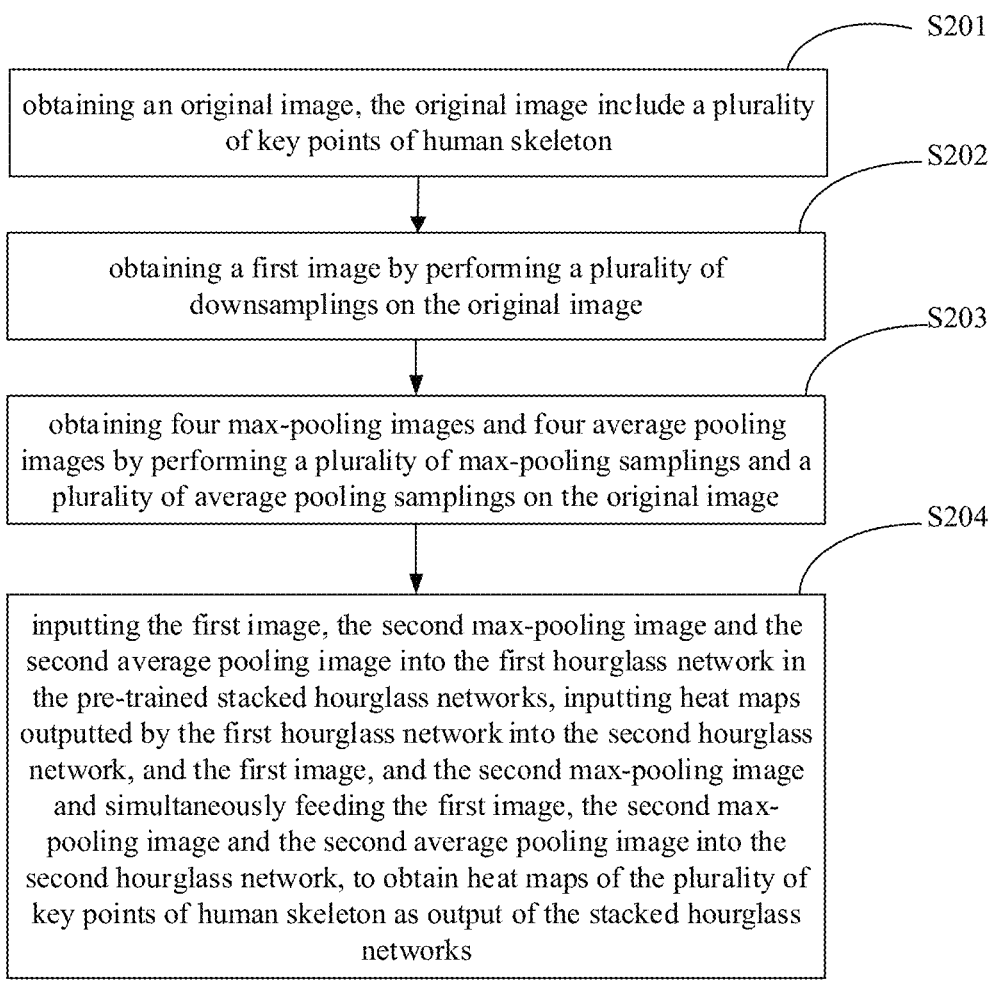
FIG. 2 is a flow chart illustrating a method for detecting key points of skeleton according to an example embodiment.

FIG. 2 is a flow chart illustrating a method for detecting key points of skeleton according to an example embodiment. The method includes the followings.

At block S201, an original image is obtained. The original image includes a plurality of key points of skeleton.

The action at block S201 is similar to the action at block S101 illustrated in FIG. 1, which is not elaborated herein.

At block S202, a first image is obtained by performing a plurality of downsamplings on the original image.

In some embodiments, a first image $I_1$ is obtained by performing two downsamplings on the original image. In detail, through a convolution layer with a step size of 2, the resolution of the original image is reduced by the factor of 2 in each downsampling, that is, the resolution of the original image is reduced from m×n to (m/2)×(n/2).

At block S203, four max-pooling images are obtained by performing a plurality of max-pooling samplings on the original image, and four average pooling images are obtained by performing a plurality of average pooling samplings on the original image.

The four max-pooling images include a first max-pooling image, a second max-pooling image, a third max-pooling image, and a fourth max-pooling image. The four average pooling images include a first average pooling image, a second average pooling image, a third average pooling image, a fourth average pooling image.

In some embodiments, the plurality of max-pooling samplings and the plurality of average pooling samplings are performed on the original image. In detail, the max-pooling sampling is performed on the original image to obtain the first max-pooling image, and the average pooling sampling is performed on the original image to obtain the first average pooling image. The max-pooling sampling is performed on the first max-pooling image to obtain the second max-pooling image, and the average pooling sampling is performed on the first average pooling image to obtain the second average pooling image. The max-pooling sampling is performed on the second max-pooling image to obtain the third max-pooling image, and the average pooling sampling is performed on the second average pooling image to obtain the third average pooling image. The max-pooling sampling is performed on the third max-pooling image to obtain the fourth max-pooling image, and the average pooling sampling is performed on the third average pooling image to obtain the fourth average pooling image. Performing the max-pooling sampling on the first max-pooling image and the average pooling sampling on the first average pooling image may be equivalent to performing two max-pooling samplings on the original image and two average pooling samplings on the original image. Similarly, performing the max-pooling sampling on the second max-pooling image and the average pooling sampling on the second average pooling image may be equivalent to performing three max-pooling samplings on the original image and three average pooling samplings on the original image. Performing the max-pooling sampling on the third max-pooling image and the average pooling sampling on the third average pooling image may be equivalent to performing four max-pooling samplings on the original image and four average pooling samplings on the original image.

In order to facilitate understanding of the detailed implementation of performing the plurality of max-pooling samplings on the original image and performing the plurality of average pooling samplings on the original image, the examples are described as follows.

Assuming that a size of the original image is 3×128×128, where, 3 refers to the number of channels of a RGB image (R represents red, G represents green, and B represents blue), and 128×128 refers to the number of pixels of the RGB image. The max-pooling sampling is performed on the original image to obtain a first max-pooling image $AM_1$, and the average pooling sampling is performed on the original image to obtain a first average pooling image $AE_1$. Each of the first max-pooling image $AM_1$ and the first average pooling image $AE_1$ has a size of 3×64×64. The max-pooling sampling is performed on the first max-pooling image of the original image to obtain the second max-pooling image $AM_2$, and the average pooling sampling is performed on the first average pooling image of the original image to obtain the second average pooling image $AE_2$. Each of the second max-pooling image $AM_2$ and the second average pooling image $AE_3$ has a size of 3×32×32. The max-pooling sampling is performed on the second max-pooling image of the original image to obtain the third max-pooling image $AM_3$ and the average pooling sampling is performed on the second average pooling image of the original image to obtain the third average pooling image $AE_3$. Each of the third max-pooling image $AM_3$ and the third average pooling image $AE_3$ has a size of 3×16×16. The max-pooling sampling is performed on the third max-pooling image of the original image to obtain the fourth max-pooling image $AM_4$, and the average pooling sampling is performed on the third average pooling image of the original image to obtain the fourth average pooling image $AE_4$. Each of the fourth max-pooling image $AM_4$ and the fourth average pooling image $AE_4$ has a size of 3×8×8.

At block S204, the first image, the second max-pooling image and the second average pooling image are inputted into the first hourglass network in the pre-trained hourglass network structure. Heat maps outputted by the first hourglass network are inputted into the second hourglass network, and simultaneously the first image, and the second max-pooling image and the second average pooling image are fed into the second hourglass network, to obtain heat maps of the key points of skeleton as output of the pre-trained hourglass network structure.

In the pre-trained hourglass network structure, based on the deep-layer feature learning of the convolution modules and the attention mechanism modules of the plurality of hourglass networks, the heat maps of the key points of skeleton may be obtained.

In some embodiments, a network structure of the first hourglass network is the same as a network structure of the second hourglass network in the pre-trained hourglass network structure. FIG. 3a illustrates a network structure of the first hourglass network or the second hourglass network. A detailed structure of a hourglass network in the pre-trained hourglass network structure will be described below with reference to the network structure of the first hourglass network or the second hourglass network illustrated in FIG. 3a. In each hourglass network, before each downsampling, a skip path is separated from a convolution path, the skip path is configured to retain the feature maps with an original scale, and the original scale is a scale of the feature maps before the downsampling. After the first downsampling, the third max-poolinging image $AM_3$ and the third average pooling image $AE_3$ are inserted into the convolution path. After the second downsampling, the fourth max-poolinging image $AM_4$ and the fourth average pooling image $AE_4$ are inserted into the convolution path. After each upsampling, the feature maps of the plurality of key points of skeleton on the convolution path are fused with the feature maps of the plurality of key points of skeletons of a previous scale on the skip path. Three convolution modules and two attention mechanism modules exist between the two downsamplings, and the three convolution modules and the two attention mechanism modules are arranged alternately. The first convolution module has M input channels and N output channels, while both the other two convolution modules have N input channels and N output channels. A convolution module exists between the two upsamplings, and the convolution module has N input channels and N output channels. Four convolution modules and two attention mechanism modules exist between the downsampling and the upsampling, and the two attention mechanism modules and the first three convolution modules are arranged alternately. The first convolution module has M input channels and N output channels, while all the other three convolution modules have N input channels and N output channels. Each skip path includes four convolution modules and two attention mechanism modules, and the two attention mechanism modules and the first three convolution modules are arranged alternately. The first convolution module has M input channels and N output channels, while all the other three convolution modules have N input channels and N output channels.

In addition, FIG. 3b exemplarily illustrates a schematic diagram of a hourglass network structure which includes a first hourglass network and a second hourglass network and may be used to generate the heat maps. The process of obtaining the heat maps of the plurality of key points of skeleton at block S204 will be described below with reference to FIG. 3b.

The first image $I_1$, the second max-pooling image $AM_2$, and the second average pooling image $AE_2$ are inputted to the first hourglass network. The heat maps $O_1$ outputted by the first hourglass network are inputted to the second hourglass network. Meanwhile, the first image $I_1$, the second max-pooling image $AM_2$, and the second average pooling image $AE_2$ are fed into the second hourglass network. The output of the first hourglass network is the heat maps $O_1$ of the plurality of key points of skeleton. During training the hourglass network structure, the first hourglass network may compare the heat maps $O_1$ with true values to generate loss and return the loss.

Based on the deep-layer feature learning of the convolution modules and the attention mechanism modules in the first hourglass network and the second hourglass network, the heat maps of the plurality of key points of skeleton are obtained. Each heat map corresponds to one key point of skeleton.

Based on embodiments of the present disclosure, the plurality of max-pooling samplings are performed on the original image in advance to obtain the plurality of max-pooling images, and the plurality of average pooling samplings are performed on the original image in advance to obtain the plurality of average pooling images. In the pooling process, information of the plurality of nearby pixels may be employed, such that the context may be introduced into the extracted feature maps of the plurality of key points of skeleton, which improves the accuracy of detecting the key points of skeleton. In each hourglass network, merely the plurality of max-pooling images and the plurality of maximum average pooling images need to be inserted, which further reduces the calculation amount and improves the calculation speed.

Meanwhile, the heat maps outputted by the first hourglass network are used as the input of the next hourglass network, such that the second hourglass network may utilize a relationship between joint points learned by the first hourglass network, which increases the input of the second hourglass network, thereby further improving the accuracy of detecting the key points of skeleton.

In addition, the attention mechanism module includes a global pooling layer, two fully connected layers and a nonlinear activation layer. FIG. 4 exemplarily illustrates a structure of an attention mechanism module. The process of obtaining the heat maps of the plurality of key points of skeleton based on the deep-layer feature learning of the convolution modules and the attention mechanism modules in the first hourglass network and the second hourglass network will be described in detail below with reference to FIG. 4. In the first hourglass network and the second hourglass network, the feature maps of the plurality of key points of skeleton are extracted by the convolution module. In the attention mechanism module, a set of weight values corresponding to the feature maps of the plurality of key points of skeleton, that is, the importance of each feature map, may be obtained by learning through the Senet algorithm. Then, the network pays more attention to the feature with a great weight value by utilizing the set of weight values.

In detail, in the attention mechanism module, the feature maps of the plurality of key points of skeleton are transmitted in a downlink path network and an uplink path network. In the uplink path network, dimension reduction is performed on the feature maps of the plurality of key points of skeleton by the global pooling layer. In the uplink path network, the feature maps of the plurality of key points of skeleton after the dimension reduction are synthesized by learning through the Senet algorithm of the two fully connected layers to obtain a one-dimensional vector. In the uplink path network, the one-dimensional vector is normalized into a feature vector by the nonlinear activation layer. In the expression of c×h×w, c represents the number of channels, h represents a height of the feature map, and w represents a width of the feature map. The number of channels may be directly specified in the fully connected layer of the neural network. The feature maps of the plurality of key points of skeleton in the downlink path network are fused with the feature vector.

According to embodiments of the present disclosure, in the attention mechanism module, the set of weight values corresponding to the feature maps of the plurality of key points of skeleton, that is, the importance of each feature map, may be obtained by learning through the Senet algorithm. Then, the network pays more attention to the feature with a great weight value by utilizing the set of weight values. The attention mechanism is introduced in the process of detecting key points of skeleton, which improves the accuracy of the learned feature maps of the plurality of key points of skeleton, thereby improving the accuracy of detecting key points of skeleton.

FIG. 5 is a block diagram illustrating an apparatus for detecting key points of skeleton according to an example embodiment. As illustrated in FIG. 5, the apparatus for detecting the key points of skeleton may include a data obtaining unit 510 and a heat map generating unit 520.

The data obtaining unit 510 is configured to obtain an original image. The original image includes a plurality of key points of skeleton.

The heat map generating unit 520 is configured to obtain heat maps of the plurality of key points by recognizing the plurality of key points from the original image based on pre-trained hourglass network structure for skeleton keypoint detection.

The pre-trained hourglass network structure includes a plurality of hourglass networks connected in series, and each hourglass network is configured to perform deep-layer feature learning on feature maps of the plurality of key points of skeleton based on weight values corresponding to the feature maps.

Alternatively, in an implementation, in each hourglass network, before each downsampling, a skip path is separated from a convolution path, the skip path is configured to retain the feature maps with an original scale, and the original scale is a scale of the feature maps before the downsampling. After each upsampling, the feature maps on the convolution path are fused with the feature maps on the skip path corresponding to the upsampling; and the skip path corresponding to the upsampling is a skip path separated before a downsampling symmetrical to the upsampling. A plurality of convolution modules and a plurality of attention mechanism modules exist between two adjacent downsamplings. One or more convolution modules exist between two adjacent upsamplings. A plurality of convolution modules and a plurality of attention mechanism modules exist between a downsampling and an upsampling adjacent to the downsampling. Each skip path includes a plurality of convolution modules and a plurality of attention mechanism modules.

Alternatively, in an implementation, in each hourglass network, the feature maps are extracted by each convolution module; and in the attention mechanism module, a set of weight values corresponding to the feature maps are obtained by a Senet algorithm learning.

Alternatively, in an implementation, the attention mechanism module includes a global pooling layer, a plurality of fully connected layers and a nonlinear activation layer. In the attention mechanism module, the feature maps are transmitted in a downlink path network and an uplink path network. In the uplink path network, dimension reduction is performed on the feature maps by the global pooling layer. In the uplink path network, the feature maps after the dimension reduction are synthesized by learning through the Senet algorithm of the plurality of fully connected layers to obtain a one-dimensional vector. In the uplink path network, the one-dimensional vector is normalized into a feature vector by the nonlinear activation layer. The feature maps in the downlink path network are fused with the feature vector.

Alternatively, in an implementation, the apparatus also includes: a downsampling unit, configured to obtain a first image by performing a plurality of downsamplings on the original image before obtaining the heat maps of the plurality of key points.

Correspondingly, the heat map generating unit is configured to obtain the heat maps by inputting the first image into the pre-trained hourglass network structure.

Alternatively, the apparatus also includes: a pooling unit, configured to perform a plurality of max-pooling samplings and a plurality of average pooling samplings on the original image before obtaining the heat maps.

Correspondingly, the heat map generating unit is configured to: obtain the heat maps by inputting the first image, an image obtained by each max-pooling sampling and an image obtained by each average pooling sampling into the pre-trained hourglass network structure.

Alternatively, the pre-trained hourglass network structure includes a first hourglass network and a second hourglass network.

The pooling unit is configured to: obtain a first max-pooling image by performing the max-pooling sampling on the original image, and obtain a first average pooling image by performing the average pooling sampling on the original image; obtain a second max-pooling image by performing the max-pooling sampling on the first max-pooling image, and obtain a second average pooling image by performing the average pooling sampling on the first average pooling image; obtain a third max-pooling image by performing the max-pooling sampling on the second max-pooling image, and obtain a third average pooling image by performing the average pooling sampling on the second average pooling image; and obtain a fourth max-pooling image by performing the max-pooling sampling on the third max-pooling image, and obtain a fourth average pooling image by performing the average pooling sampling on the third average pooling image.

Correspondingly, the heat map generating unit is configured to: input the first image, the first max-pooling image and the first average pooling image into the first hourglass network; input heat maps outputted by the first hourglass network into the second hourglass network, and simultaneously feed the first image, the second max-pooling image and the second average pooling image into the second hourglass network; insert the third max-pooling image and the third average pooling image into the convolution path of each hourglass network after the hourglass network performs the first downsampling; and insert the fourth max-pooling image and the fourth average pooling image into the convolution path of each hourglass network after the hourglass network performs the second downsampling.

Corresponding to the above method embodiments, embodiments of the present disclosure also provides an electronic device capable of executing the above method for detecting the key points of skeleton. The electronic device includes a processor and a memory. The memory is configured to store instructions executable by the processor. The processor is configured to execute the method for detecting the key points of skeleton according to any one of embodiments of the present disclosure.

FIG. 6 is a block diagram illustrating an electronic device 600 capable of executing a method for detecting key points of skeleton according to an exemplary embodiment. For example, the electronic device 600 may be a mobile phone, a computer, a digital broadcast terminal, a messaging device, a game console, a tablet device, a medical device, an exercise device, a personal digital assistant, and so on.

Referring to FIG. 6, the electronic device 600 may include one or more of: a processing component 602, a memory 604, a power component 606, a multimedia component 608, an audio component 610, an input/output (I/O) interface 612, a sensor component 614, and a communication component 616.

The processing component 602 normally controls the overall operation (such as operations associated with displaying, telephone calls, data communications, camera operations and recording operations) of the electronic device

600. The processing component 602 may include one or a plurality of processors 620 to execute instructions so as to perform all or part of the steps of the above method for detecting the key points of skeleton according to embodiments of the present disclosure. In addition, the processing component 602 may include one or a plurality of units to facilitate interactions between the processing component 602 and other components. For example, the processing component 602 may include a multimedia unit to facilitate interactions between the multimedia component 608 and the processing component 602.

The memory 604 is configured to store various types of data to support operations at the electronic device 600. Examples of such data include instructions for any application or method operated on the electronic device 600, contact data, phone book data, messages, images, videos and the like. The memory 604 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 606 provides power to various components of the electronic device 600. The power component 606 may include a power management system, one or more power sources and other components associated with power generation, management, and distribution of the electronic device 600.

The multimedia component 608 includes a screen that provides an output interface between the electronic device 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only the boundary of the touches or sliding actions, but also the duration and pressure related to the touches or sliding operations. In some embodiments, the multimedia component 608 includes a front camera and/or a rear camera. When the electronic device 600 is in an operation mode such as a shooting mode or a video mode, the front camera and/or the rear camera may receive external multimedia data. Each front camera and rear camera may be a fixed optical lens system or have a focal length and an optical zoom capability.

The audio component 610 is configured to output and/or input an audio signal. For example, the audio component 610 includes a microphone (MIC) that is configured to receive an external audio signal when the electronic device 600 is in an operation mode such as a call mode, a recording mode, and a voice recognition mode. The received audio signal may be further stored in the memory 604 or transmitted via the communication component 616. In some embodiments, the audio component 610 also includes a speaker for outputting audio signals. The I/O interface 612 provides an interface between the processing component 602 and a peripheral interface unit. The peripheral interface unit may be a keyboard, a click wheel, a button and so on. These buttons may include, but are not limited to, a home button, a volume button, a start button, and a locking button.

The sensor assembly 614 includes one or more sensors for providing the electronic device 600 with various aspects of status assessments. For example, the sensor component 614 may detect an ON/OFF state of the electronic device 600 and a relative positioning of the components. For example, the components may be a display and a keypad of the electronic device 600. The sensor component 614 may also detect a change in position of the electronic device 600 or a component of the electronic device 600, the presence or absence of contact of the user with the electronic device 600, the orientation or acceleration/deceleration of the electronic device 600 and a temperature change of the electronic device 600. The sensor component 614 may include a proximity sensor configured to detect the presence of nearby objects without any physical contact. The sensor component 614 may also include a light sensor (such as a CMOS or a CCD image sensor) for use in imaging applications. In some embodiments, the sensor component 614 may also include an acceleration sensor, a gyro sensor, a magnetic sensor, a pressure sensor, or a temperature sensor.

The communication component 616 is configured to facilitate wired or wireless communication between the electronic device 600 and other devices. The electronic device 600 may access a wireless network based on a communication standard such as 2G, 3G, 4G, 5G or a combination thereof. In an exemplary embodiment, the communication component 616 receives broadcast signals or broadcast-associated information from an external broadcast management system via a broadcast channel. In an exemplary embodiment, the communication component 616 also includes a near field communication (NFC) module to facilitate short range communication. For example, the NFC module may be implemented based on radio frequency identification (RFID) technology, infrared data association (IrDA) technology, ultra-wide band (UWB) technology, Bluetooth (BT) technology and other technologies.

In an exemplary embodiment, the electronic device 600 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above image conversion method.

Figure 7:
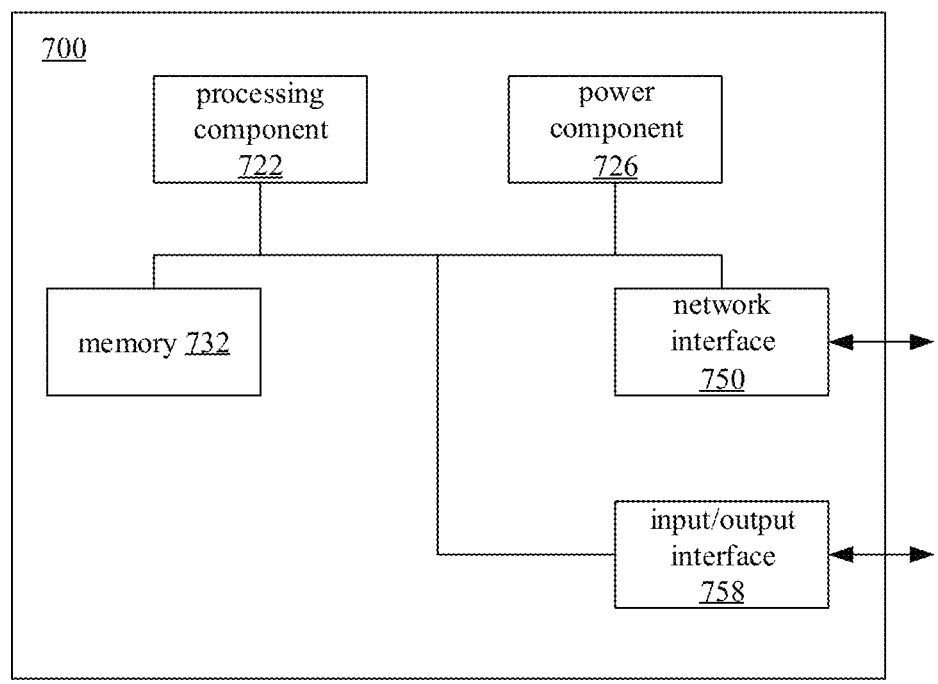
FIG. 7 is a block diagram illustrating an electronic device capable of executing a method for detecting key points of skeleton according to an example embodiment.

FIG. 7 is a block diagram illustrating an electronic device 700 capable of executing a method for detecting key points of skeleton according to an exemplary embodiment. For example, the electronic device 700 is provided as a server. Referring to FIG. 7, the electronic device 700 includes a processing component 722 including one or more processors and a memory resource represented by a memory 732. The memory 732 is configured to store instructions executable by the processing component 722, such as an application program. The application program stored in the memory 732 may include one or more modules each corresponding to a set of instructions. In addition, the processing component 722 is configured to execute instructions so as to implement the method for detecting key points of skeleton described above.

The electronic device 700 may also include a power component 726 configured to perform power management of the electronic device 700, a wired or wireless network interface 750 configured to connect the electronic device 700 to a network, and an input/output (I/O) interface 758. The electronic device 700 may operate an operating system stored in the memory 732, such as Windows Server™, Mac OS X™, Unix™, Linux™, FreeBSD™ or similar operating systems.

Corresponding to the above method embodiments, embodiments of the present disclosure also provide a non-transitory computer readable storage medium including instructions. When the instructions are executed, the method for detecting the key points of skeleton according to embodiments of the present disclosure is implemented. For example, the non-transitory computer readable storage medium may be a ROM, a random access memory (RAM), a CD-ROM (compact disc read-only memory), a magnetic tape, a floppy disk, an optical data storage device, etc.

The above descriptions are only preferred embodiments of the present disclosure, and are not intended to limit the present disclosure. Any modification, equivalent replacement and improvement made within the spirit and principle of the present disclosure shall be included in the protection scope of the present disclosure.

What is claimed is:

1. A method for detecting key points of skeleton, comprising: obtaining an original image, wherein the original image comprises a plurality of key points of skeleton; establishing a plurality of hourglass networks, wherein each one of the plurality of hourglass networks comprises a convolution module and an attention mechanism module, and the attention mechanism module comprises: a global pooling layer, a plurality of fully connected layers and a nonlinear activation layer; in the plurality of hourglass networks, obtaining heat maps of the plurality of key points by performing deep-layer feature learning on feature maps of the plurality of key points based on weight values corresponding to the feature maps, extracting, in each of the plurality of hourglass networks, the feature maps of the plurality of key points by the convolution module, and in the attention mechanism module, obtaining a set of weights corresponding to the feature maps of the plurality of key points by learning through a Senet algorithm, and fusing the feature maps of the plurality of key points with the set of weights.

2. The method of claim 1, further comprises:
obtaining a first image by performing a plurality of downsamplings on the original image.

3. The method of claim 2, further comprising:
performing a plurality of max-pooling samplings and a plurality of average pooling samplings on the original image.

4. The method of claim 3,
said performing the plurality of max-pooling samplings and the plurality of average pooling samplings on the original image comprising:
obtaining a first max-pooling image by performing the max-pooling sampling on the original image, and obtaining a first average pooling image by performing the average pooling sampling on the original image;
obtaining a second max-pooling image by performing the max-pooling sampling on the first max-pooling image, and obtaining a second average pooling image by performing the average pooling sampling on the first average pooling image;
obtaining a third max-pooling image by performing the max-pooling sampling on the second max-pooling image, and obtaining a third average pooling image by performing the average pooling sampling on the second average pooling image; and
obtaining a fourth max-pooling image by performing the max-pooling sampling on the third max-pooling image, and obtaining a fourth average pooling image by performing the average pooling sampling on the third average pooling image.

5. The method of claim 4, said establishing a plurality of hourglass networks comprising:
establishing a first hourglass network; and
establishing a second hourglass network,
wherein both the first hourglass network and the second hourglass network are second-order hourglass networks.

6. The method of claim 5, wherein, in each hourglass network, before each downsampling, a skip path is separated from a convolution path, and the skip path is configured to retain the feature maps with an original scale;
after a first downsampling, the third max-pooling image and the third average pooling image are inserted into the convolution path;
after a second downsampling, the fourth max-pooling image and the fourth average pooling image are inserted into the convolution path;
after each upsampling, the feature maps of the plurality of key points on the convolution path are fused with the feature maps of the plurality of key points of a previous scale on the skip path, wherein the previous scale on the skip path is the original scale retained by the skip path separated from the convolution path before each downsampling;
a plurality of convolution modules and a plurality of attention mechanism modules exist between two adjacent downsamplings;
one or more convolution modules exist between two adjacent upsamplings;
a plurality of convolution modules and a plurality of attention mechanism modules exist between a downsampling and an upsampling adjacent to the downsampling; and
each skip path includes a plurality of convolution modules and a plurality of attention mechanism modules.

7. The method of claim 6, said obtaining heat maps of the plurality of key points by performing deep-layer feature learning on feature maps of the plurality of key points based on weight values corresponding to the feature maps comprising:
inputting the first image, the second max-pooling image, and the second average pooling image into the first hourglass network;
inputting a heat map output by the first hourglass network into the second hourglass network, and simultaneously feeding the first image, the second max-pooling image and the second average pooling image into the second hourglass network; and
obtaining the heat maps of the key points based on the deep feature learning of the convolution modules and the attention mechanism modules of the plurality of hourglass networks,
wherein obtaining the heat maps of the key points of skeleton based on the deep feature learning of the convolution modules and the attention mechanism modules of the plurality of hourglass networks comprises:
in the first hourglass network and the second hourglass network, extracting the feature maps of the plurality of key points by the convolution module;
in the attention mechanism module, transmitting the feature maps in a downlink path network and an uplink path network;
in the uplink path network, performing dimension reduction on the feature maps by the global pooling layer;
in the uplink path network, obtaining a one-dimensional vector by synthesizing the feature maps after the dimension reduction by the learning through the Senet algorithm of the plurality of fully connected layers;

in the uplink path network, normalizing the one-dimensional vector into a feature vector by the nonlinear activation layer; and fusing the feature maps in the downlink path network with the feature vector.

8. An electronic device, comprising: a processor; and a memory, configured to store instructions executable by the processor, wherein the processor is configured to execute the method for detecting key points of skeleton comprising: obtaining an original image, wherein the original image comprises a plurality of key points of skeleton; establishing a plurality of hourglass networks, wherein each one of the plurality of hourglass networks comprises a convolution module and an attention mechanism module, and the attention mechanism module comprises: a global pooling layer, a plurality of fully connected layers and a nonlinear activation layer; in the plurality of hourglass networks, obtaining heat maps of the plurality of key points by performing deep-layer feature learning on feature maps of the plurality of key points based on weight values corresponding to the feature maps, extracting, in each of the plurality of hourglass networks, the feature maps of the plurality of key points by the convolution module, and in the attention mechanism module, obtaining a set of weights corresponding to the feature maps of the plurality of key points by learning through a Senet algorithm, and fusing the feature maps of the plurality of key points with the set of weights.

9. A non-transitory computer readable storage medium having computer instructions stored thereon, wherein the method for detecting key points of skeleton implemented when the computer instructions are executed comprises: obtaining an original image, wherein the original image comprises a plurality of key points of skeleton; establishing a plurality of hourglass networks, wherein each one of the plurality of hourglass networks comprises a convolution module and an attention mechanism module, and the attention mechanism module comprises: a global pooling layer, a plurality of fully connected layers and a nonlinear activation layer; in the plurality of hourglass networks, obtaining heat maps of the plurality of key points by performing deep-layer feature learning on feature maps of the plurality of key points based on weight values corresponding to the feature maps, extracting, in each one of the plurality of hourglass networks, the feature maps of the plurality of key points by the convolution module, and in the attention mechanism module, obtaining a set of weights corresponding to the feature maps of the plurality of key points by learning through a Senet algorithm, and fusing the feature maps of the plurality of key points with the set of weights.

10. An apparatus for detecting key points of skeleton, comprising: a data obtaining unit, configured to obtain an original image, wherein the original image comprises a plurality of key points of skeleton; a network establishing unit, configured to establish a plurality of hourglass networks, wherein each one of the plurality of hourglass networks comprises a convolution module and an attention mechanism module, and the attention mechanism module comprises: a global pooling layer, a plurality of fully connected layers and a nonlinear activation layer; a detecting unit, configured to, in the plurality of hourglass networks, obtain heat maps of the plurality of key points by performing deep-layer feature learning on feature maps of the plurality of key points based on weight values corresponding to the feature maps, wherein obtaining the heat maps of the plurality of key points by performing deep-layer feature learning on feature maps of the plurality of key points based on weight values corresponding to the feature maps, extracting, in each of the plurality of hourglass networks, the feature maps of key points by the convolution module, and in the attention mechanism module, obtaining a set of weights corresponding to the feature maps of the plurality of key points by learning through a Senet algorithm, and fusing the feature maps of the plurality of key points with the set of weights.

11. The method of claim 10, further comprising:
a downsampling unit, configured to obtain a first image by performing a plurality of downsamplings on the original image.

12. The method of claim 11, further comprising:
a pooling unit, configured to perform a plurality of max-pooling samplings and a plurality of average pooling samplings on the original image.

* * * * *